United States Patent [19]
Sundequist

[11] 3,918,224
[45] Nov. 11, 1975

[54] MOUNTING BAR SYSTEM FOR ATTACHING INTERIOR FITTINGS AND ELECTRIC WIRING TO A CONCRETE CEILING
[75] Inventor: Åke Sundequist, Skovde, Sweden
[73] Assignee: Åke Sundequist Konsult AB, Skovde, Sweden
[22] Filed: Nov. 23, 1973
[21] Appl. No.: 418,703

[30] Foreign Application Priority Data
Nov. 23, 1972 Sweden.............................. 15302/72

[52] U.S. Cl. ...................... 52/221; 52/710; 174/48; 339/20; 339/21 M; 339/21 S
[51] Int. Cl.² ........................................... E04B 5/48
[58] Field of Search............... 52;36;710;221/; 85/83; 339/20, 21 M, 21 S; 174/48

[56] References Cited
UNITED STATES PATENTS

| 1,213,649 | 1/1917 | Hunter...................... 52/710 |
| 2,117,832 | 5/1938 | Wellner..................... 85/83 |
| 2,234,097 | 3/1941 | Tinnerman................. 85/83 |
| 2,326,903 | 8/1943 | Tinnerman................. 85/83 |
| 2,676,680 | 4/1954 | Kindorf..................... 52/710 |
| 2,909,054 | 10/1959 | Phillips..................... 52/710 |
| 2,924,089 | 2/1960 | Reiland...................... 52/710 |
| 3,121,978 | 2/1964 | Reiland...................... 52/710 |
| 3,210,716 | 10/1965 | Mecham.................... 52/710 |
| 3,407,547 | 10/1968 | Doke......................... 52/36 |
| 3,683,100 | 8/1972 | Deal........................... 174/48 |
| 3,710,530 | 1/1973 | Valtonen................... 52/221 |
| 3,730,477 | 5/1973 | Wavrunek................. 52/36 |
| 3,760,133 | 9/1973 | Howard..................... 339/21 M |
| 3,793,793 | 2/1974 | Dobbins.................... 52/221 |

FOREIGN PATENTS OR APPLICATIONS

| 278,131 | 1/1970 | Switzerland.............. 52/220 |
| 81,946 | 10/1963 | France...................... 174/48 |

Primary Examiner—Ernest R. Purser
Assistant Examiner—Henry Raduazo
Attorney, Agent, or Firm—Elliott I. Pollock

[57] ABSTRACT

A dual purpose electrical distribution/mechanical support system comprises at least one elongated U-section mounting bar embedded in a concrete ceiling with the bar opening flush with the ceiling. Electrical conductors are disposed along the interior sides of the bar to cooperate with electrical connector plugs removably inserted through the bar openings for energizing electrical fixtures. Mechanical suspension members are also removably inserted into the same bar, and are supported by the bar adjacent the bar opening in spaced relation to the conductors, to provide a mechanical support for suspending cabinets, walls, and the like, from the ceiling-mounted bar.

7 Claims, 5 Drawing Figures

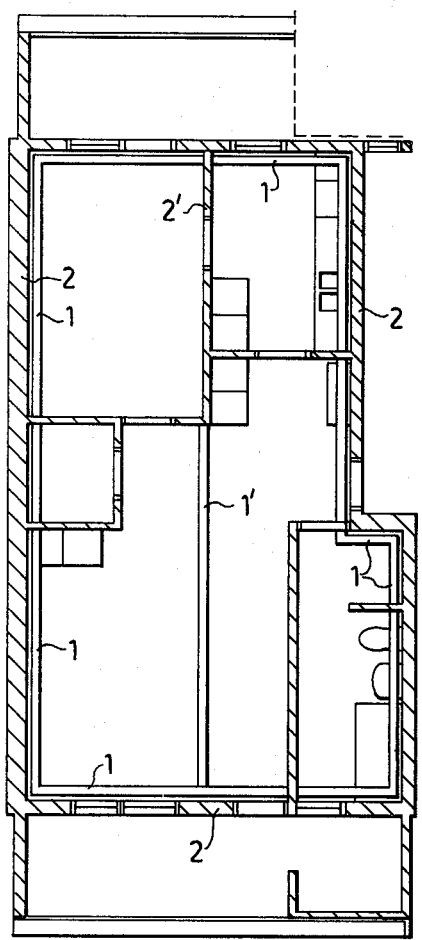
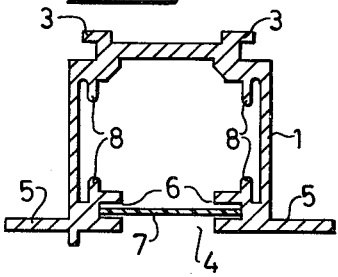
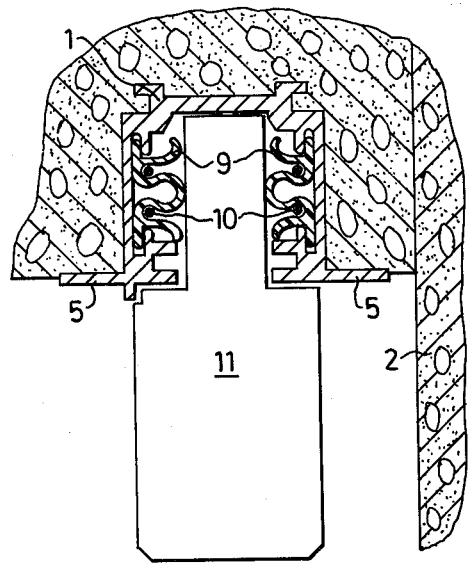
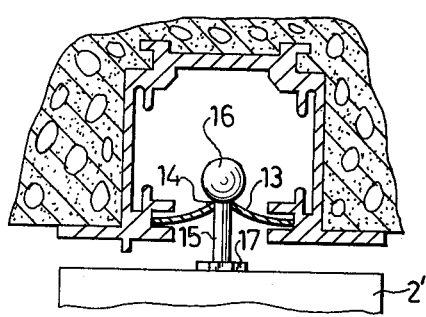
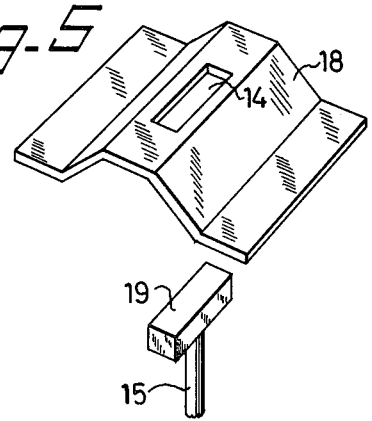

MOUNTING BAR SYSTEM FOR ATTACHING INTERIOR FITTINGS AND ELECTRIC WIRING TO A CONCRETE CEILING

The present invention relates to a mounting bar system for attaching interior fittings and electric wiring to a concrete ceiling.

In buildings having concrete ceilings and walls different problems are involved in attaching electric wiring and interior fittings, such as fixedly mounted equipment (e.g. wall supported kitchen cupboards) curtain rods, ceiling light fittings, partition walls and so on. It is certainly possible to locate the electric wiring in tubes embedded in ceilings and walls in connection with the moulding, but in this case the positioning of outlet boxes and similar fittings must be decided in advance and cannot be changed subsequently. Also the interior fittings have to be attached to mounting means embedded in the concrete in connection with the moulding at fixed places. Metal bars and wooden borders fixedly attached to walls, however, permit a slight alteration of the positioning of some interior fittings. In special cases, e.g. for showing ceiling lamps in department stores it is known to use open profiled mounting bars (U-shaped profile) hanging from the ceiling, which bars are provided with semi-protected internal bare conductors or wires. By means of special connecting plugs inserted into the opening of the open profiled bars it is possible to connect lamp fittings at arbitrary points along the bars. Such mounting bars, however, are unsuitable in apartments, office premises and similar places, e.g. for aesthetical reasons.

It is therefore the principal object of the present invention to provide a simple and suitable solution to these problems.

With this object in view, the present invention resides in a mounting bar system for attaching interior fittings and electric wiring to a concrete ceiling which, according to the invention, is characterized in that the bars for both purposes consist of downwardly open profiled bars provided with external attachment means fixedly embedded in the concrete ceiling with the openings of the bars being substantially level with the surface of the ceiling, and with internal attachment means, known per se, for attaching electric wires to the inner surfaces of opposite side walls of the profiled bars, as well as internal slots located close to the openings of the profiled bars in said opposite side walls of the profiled bars, in which slots different strip shaped members are slidingly positioned covering portions of the openings and serving as suspension members for said interior fittings. For this latter purpose the strip shaped members are provided with longitudinal slots and are bulging towards the interior of the profiled bars to impart to the slotted members an increased stiffness against the action of the load on the slotted members from interior fittings provided with suspension means extending through the slots and engaging the upper sides of the slotted members.

Thus, the mounting bars are embedded in the ceiling in connection with the moulding of the concrete ceiling preferably in parallel with and close to supporting walls and possibly also across the ceiling in accordance with a predetermined module system. The interior of the bars are protected against getting dirty by strip shaped members or temporary sealing strips covering the down-turned openings of the bars. Immediately after the conductors of the bars may be supplied with power for use as a power supply during the construction work. After removing or separating portions of the strip shaped members it is possible to connect the connecting plugs to the conductors at arbitrary points along the bars.

The invention will become more readily apparent from the following description of a preferred embodiment thereof shown, by way of example only, in the accompanying drawings, in which:

FIG. 1 is a plan view of an apartment provided with a mounting bar system according to the invention;

FIG. 2 is a cross-sectional view of a mounting bar;

FIG. 3 is cross-sectional view of an embedded bar provided with a connecting plug;

FIG. 4 is a cross-sectional view of an embedded bar provided with a suspension means for a partition wall; and FIG. 5 is a perspective view of a modified suspension means and its strip shaped member provided with a slot.

In FIG. 1 showing an apartment having concrete ceiling, floor and walls, the profiled bars 1 according to the invention are embedded in the ceiling close to the supporting walls 2. Moreover, a profiled bar 1' is embedded in the ceiling in the center plane of a partition wall 2' and along the extension of this plane. The intersections of the bars 1, 1' are connected by suitable extension and corner pieces. The bars have an U-shaped profile, as shown in FIG. 2 and are provided with external flanges or attachment means 3 permitting a secure embedding of the bars in the ceiling with the openings 4 of the bars located sbstantially level with the surface of the ceiling. Laterally 7rotruding wlanges 5 cover the joints between bars and concrete. A bar 1 embedded close to a wall 2 is shown in FIG. 3.

Each bar is provided with internal slots 6 located close to the openings 4, in which slots an elongated covering strip 7 is inserted. Each bar 1, 1' is provided with four internal insulator flanges 8 by which two internal attachment means 9, known per se, are attached to opposite side walls of the bar, by which insulator means electric conductors 10 (e.g. conductors for power, television aerial, signal systems etc) are mounted in the bars in a semiprotected manner. The conductors of the bar system are connected to one another by the connection pieces and corner pieces and are connected to the power distributing system of the building.

The conductors 10 are accessible at any point along the bars 1, 1' by making an opening in the covering strip 7, so that a connecting plug 11, known per se, can be inserted into the interior of the bar 1, 1' through the opening 4. The connecting plug 11 is provided with contact fingers, not shown, which e.g. after turning the plug around its longitudinal axis, contact the conductors 10. At the same time flanges, not shown, of the plug 11 may engage the slots 6 to secure the plug in position in the bar. The connecting plugs 11 are used for connecting the conductors 10 to lamp fittings, wall terminals, wall switches etc., and the conductors of the bar 1' are mainly used for connecting ceiling light fittings.

The bars 1 perform a dual function, i.e., in addition to providing a power distribution system they are also used as a mechanical support structure for suspension of kitchen cupboards, curtain rods, etc. with the bar 1' being used for suspension of a partition wall 2' as shown in FIG. 4. For this latter purpose a portion of the covering strip 7 is removed and a strip shaped member 13 is inserted in the slots 6, which member is provided with one or more slots 14 through which suspension members 15, e.g. having ball shaped heads, are pressed so that the strip shaped member 13 bulges towards the interior of the bar, as shown in FIG. 4, to fasten the suspension members 15. The suspension members 15 are suitably attached by threaded end portions and locking nuts 17 to the partition wall, as shown in FIG. 4, so that the partition wall may be adjusted in vertical direction, if necessary.

The strip shaped member 13 may, in an alternative form of the invention have the shape of the member 18 shown in FIG. 5. In this case the suspension member 15 may be provided with a longitudinal head 19 adapted to the shape of the slot 14, which head may be inserted through the slot 14 and after a turning by 90° may be locked by the nut 17.

The bars 1, 1' may consist of plastics but preferably consist of metal. The covering strips 7 suitably are made of plastics and the members 13, 18 are suitably made of metal.

What is claimed is:

1. A dual-purpose electrical distribution/mechanical support system comprising a building structure having a ceiling fabricated of concrete, at least one elongated mounting bar fixedly embedded in said concrete ceiling, said bar having a substantially U-shaped cross section comprising a pair of substantially parallel sides the lower edges of which are spaced from one another to define an elongated opening therebetween located substantially flush with the interior surface of said ceiling, the exteriors of said parallel sides being substantially completely bounded by the concrete of said ceiling to prevent said sides from spreading apart when outwardly directed forces are exerted on the interiors of said sides, a plurality of electrical conductors supported along the interior surfaces of said parallel sides above and spaced from said opening, the lower edges of said parallel sides defining a pair of inwardly extending support flanges adjacent said ceiling surface and below said conductors, at least one removable electrical plug extending through said opening for making electrical contact with said conductors to provide a source of electrical energization within said building structure, and suspension means removably supported by said flanges in spaced relation to said electrical plug and in non-contacting, spaced relation to said conductors to provide support for a mechanical fixture which is suspended within said building structure from said ceiling mounted bar, said suspension means comprising a strip-shaped member having a pair of opposing edges which engage said pair of flanges respectively adjacent said opening, said member being shaped between its edges to bulge away from said opening toward the interior of said U-shaped bar whereby forces exerted downwardly from the bulged portion of said member toward the interior of said building structure impose forces on the interior sides of said mounting bar in directions tending to spread said sides apart, said inwardly bulging portion of said member having at least one aperture therein, and a support element remvovably attached to said member at said aperture and extending through said opening toward the interior of said building structure for attachment to said mechanical fixture, said support element comprising a rod extending through said aperture and having a shaped head at its upper end for attaching said rod to said member.

2. The structure of claim 1 wherein the lower end of said rod includes a threaded portion for attaching said rod to said mechanical fixture.

3. The structure of claim 1 wherein said head is ball-shaped.

4. The structure of claim 1 wherein said head is of elongated rectangular shape.

5. The structure of claim 1 including an elongated flat cover strip having a pair of spaced edges in separable engagement with said flanges respectively for covering said opening between said plug and said suspension means.

6. The structure of claim 1 wherein said building structure includes a wall, said mounting bar being embedded in said ceiling along a line parallel to said wall at a position closely adjacent the surface of said wall which faces the interior of said building structure.

7. The structure of claim 1 wherein said mechanical fixture comprises a partition wall within said building structure.

* * * * *